United States Patent
Kim et al.

(10) Patent No.: US 11,418,431 B2
(45) Date of Patent: *Aug. 16, 2022

(54) MOBILE ACCELERATOR

(71) Applicant: CLOUDFLARE, INC., San Francisco, CA (US)

(72) Inventors: Jeff Sesung Kim, Milpitas, CA (US); Jun Ho Choi, Mountain View, CA (US)

(73) Assignee: CLOUDFLARE, INC., San Francisco, CA (US)

( * ) Notice: Subject to any disclaimer, the term of this patent is extended or adjusted under 35 U.S.C. 154(b) by 622 days.

This patent is subject to a terminal disclaimer.

(21) Appl. No.: 16/505,458

(22) Filed: Jul. 8, 2019

(65) Prior Publication Data

US 2019/0334812 A1 Oct. 31, 2019

Related U.S. Application Data

(63) Continuation of application No. 14/863,339, filed on Sep. 23, 2015, now Pat. No. 10,349,304.

(51) Int. Cl.
 *H04L 12/725* (2013.01)
 *H04W 40/00* (2009.01)
 (Continued)

(52) U.S. Cl.
 CPC .......... *H04L 45/306* (2013.01); *H04W 40/00* (2013.01); *H04L 67/00* (2013.01); *H04W 88/182* (2013.01)

(58) Field of Classification Search
 CPC ..... H04L 45/306; H04L 67/00; H04L 45/121; H04L 45/122; H04L 63/168; H04W 4/60;
 (Continued)

(56) References Cited

U.S. PATENT DOCUMENTS 6,973,489 B1 * 12/2005 Levy ................ H04L 43/00
                                                  709/224
8,472,324 B1 *  6/2013 Richardson ...... H04L 45/42
                                                  370/235
(Continued)

FOREIGN PATENT DOCUMENTS

WO      2006105158 A2   10/2006

OTHER PUBLICATIONS

International Search Report and Written Opinion for Application No. PCT/US2016/045642, dated Oct. 20, 2016, 12 pages.

(Continued)

*Primary Examiner* — Awet Haile
(74) *Attorney, Agent, or Firm* — Nicholson De Vos Webster & Elliott LLP

(57) ABSTRACT

A mobile accelerator system includes point of presences (POPs) that includes an entry POP. The entry POP receives a query to a content server from a mobile device via a dedicated transport channel. The entry POP determines a direct connection score for a direct connection between the mobile device and the content server that does not traverse the mobile accelerator system. The entry POP determines a POP connection score for a connection between the mobile device and the content server through the entry POP and a candidate exit POP. The entry POP determines a dynamic path ranking based on the direct connection score, the POP connection score, and other POP connection score(s) associated with other candidate exit POP(s). The entry POP determines at least a portion of a dynamic path between the mobile device based on the dynamic path ranking and routes data transfers through that dynamic path.

21 Claims, 6 Drawing Sheets

(51) Int. Cl.
*H04L 45/302* (2022.01)
*H04W 88/18* (2009.01)
*H04L 67/00* (2022.01)

(58) Field of Classification Search
CPC ..... H04W 8/18; H04W 40/00; H04W 88/182; H04W 24/08; H04W 40/20; H04W 76/12
See application file for complete search history.

(56) References Cited

U.S. PATENT DOCUMENTS

| | | | |
|---|---|---|---|
| 8,751,613 | B1 | 6/2014 | Medved et al. |
| 8,819,187 | B1 | 8/2014 | Hofmann et al. |
| 9,209,991 | B1 * | 12/2015 | Tillman ............... H04L 45/00 |
| 2001/0055285 | A1 | 12/2001 | Tomoike et al. |
| 2002/0009079 | A1 | 1/2002 | Jungck et al. |
| 2004/0122907 | A1 | 6/2004 | Chou et al. |
| 2007/0056020 | A1 | 3/2007 | Ward et al. |
| 2007/0121679 | A1 * | 5/2007 | Strutt ............... H04J 3/0682 370/516 |
| 2008/0008162 | A1 * | 1/2008 | Martinez ............... H04L 45/22 370/352 |
| 2009/0228603 | A1 * | 9/2009 | Ritzau ............... H04L 67/288 709/238 |
| 2011/0004698 | A1 | 1/2011 | Wu et al. |
| 2011/0154477 | A1 | 6/2011 | Parla et al. |
| 2011/0167111 | A1 | 7/2011 | Day et al. |
| 2012/0057456 | A1 * | 3/2012 | Bogatin ............... H04W 4/50 370/230.1 |
| 2012/0163385 | A1 | 6/2012 | Lee et al. |
| 2013/0163428 | A1 | 6/2013 | Lee et al. |
| 2013/0282863 | A1 | 10/2013 | Sebastian et al. |
| 2014/0067913 | A1 | 3/2014 | Von et al. |
| 2014/0101254 | A1 | 4/2014 | Raghunath et al. |
| 2016/0050612 | A1 * | 2/2016 | Axnäs ............... H04W 40/24 370/329 |
| 2016/0094621 | A1 | 3/2016 | Wolfe et al. |
| 2016/0173387 | A1 * | 6/2016 | Chandrayana ......... H04L 67/02 370/231 |

OTHER PUBLICATIONS

Non-Final Office Action from U.S. Appl. No. 14/863,339, dated Dec. 14, 2017, 13 pages.
Non-Final Office Action from U.S. Appl. No. 14/863,339, dated Jul. 27, 2018, 8 pages.
Notice of Allowance from U.S. Appl. No. 14/863,339, dated Feb. 28, 2019, 8 pages.
International Search Report and Written Opinion for Application No. PCT/US2016/018311, dated Apr. 29, 2016, 19pages.
Non-Final Office Action from U.S. Appl. No. 14/644,116, dated Nov. 4, 2016, 22 pages.

* cited by examiner

400

| IP Prefix — 402 | Netmask — 404 | Port — 406 | TTL — 408 |
|---|---|---|---|
| 11.22.33.0 | 24 | 80 | 12 hours left |
| 22.33.44.0 | 24 | 443 | 8 hours left |

FIG. 4

MOBILE ACCELERATOR

CROSS-REFERENCE TO RELATED APPLICATIONS

This application is a continuation of U.S. application Ser. No. 14/863,339 filed Sep. 23, 2015, which is hereby incorporated by reference.

FIELD

Embodiments of the invention relate, generally, to networked content delivery for mobile devices.

BACKGROUND

Technologies such as Wi-Fi or mobile broadband (e.g., 2G/3G/long-term evolution (LTE), etc.) allow mobile devices, such as cellphones or smartphones, to connect with remote content servers via the Internet. The speed of content delivery can affect the quality of data access and mobile device performance. For example, fast internet browsing, high quality video or audio data streaming, or multiplayer gaming may require data transfer rates that are faster than the capacities of conventional mobile data networks. Virtually any mobile device application supported by Internet connectivity is enhanced with faster data transfer rates. In this regard, improvements to networked content delivery for mobile devices are desirable.

BRIEF SUMMARY

Through applied effort, ingenuity, and innovation, solutions to improve such mobile devices have been realized and are described herein. Some embodiments may provide for a mobile accelerator system including a point of presence (POP), including: a proxy server configured to: receive traffic associated with a content server, wherein the traffic uses a port associated with a predefined protocol; determine, based on accessing a dynamic filter, whether the content server has been associated with traffic that fails to use the predefined protocol, wherein the dynamic filter defines a list of content servers that have been associated with traffic that uses the port but fails to use the predefined protocol; in response to determining that the content server has not been associated with traffic that fails to use the predefined protocol: analyze the traffic to determine whether the traffic currently is using the predefined protocol; and in response to determining that the traffic currently fails to use the predefined protocol, update the dynamic filter such that the content server is associated with traffic that fails to use the predefined protocol.

In some embodiments, the dynamic filter defines a time to live (TTL) associated with of the content server. The proxy server configured to determine, based on accessing the dynamic filter, whether the content server has been associated with traffic that fails to use the predefined protocol includes the proxy server being configured to determine, based on accessing the dynamic filter, whether a TTL associated with the content server has lapsed. The proxy server configured to update the dynamic filter such that the content server is associated with traffic that fails to use the predefined protocol includes the proxy server being configured to update the dynamic filter such that a new TTL is associated with the content server.

In some embodiments, the proxy server may be further configured to, in response to determining that the traffic currently fails to use the predefined protocol, route data transfers between the mobile device and second content server to bypass the mobile accelerator system.

In some embodiments, the proxy server may be further configured to, in response to determining that the traffic currently is using the predefined protocol: optimize the traffic based on the predefined protocol; determine a dynamic path between the mobile device and the content server through the proxy server; and route data transfers between the mobile device and the content server through the dynamic path.

In some embodiments, the POP may be an entry POP. The dynamic path may include the entry POP and an exit POP. The mobile accelerator system may include a plurality of interconnected POPs including the entry POP and the exit POP.

In some embodiments, the proxy server may be further configured to: receive second traffic associated with a second content server, wherein the second traffic utilizes the port associated with the predefined protocol; determine, based on accessing the dynamic filter, whether the second content server has been associated with traffic that fails to use the predefined protocol; in response to determining that the second content server has been associated with traffic that fails to use the predefined protocol, route data transfers between the mobile device and the second content server to bypass the mobile accelerator system without analyzing the second traffic to determine whether the second traffic currently is using the predefined protocol.

In some embodiments, the POP may further include a virtual private network (VPN) server configured to: create a dedicated transport channel with a mobile device; receive the traffic associated with the content server from the mobile device via the dedicated transport channel; determine whether the traffic is utilizing the port associated with the predefined protocol; and in response to determining that the traffic is utilizing the port associated with the predefined protocol, send the traffic to the proxy server.

In some embodiments, the proxy server configured to analyze the traffic to determine whether the traffic currently is using the predefined protocol may include the proxy server being configured to parse the traffic.

In some embodiments, the port may be a transmission control protocol (TCP) port 80. The predefined protocol may be hypertext transfer protocol (HTTP). In some embodiments, the port may be a TCP port 443. The predefined protocol may be secure hypertext transfer protocol (HTTPS).

In some embodiments, the dynamic filter may include a data entry associated with the content server, the data entry including an internet protocol (IP) prefix, a netmask, the port, and a TTL.

Some embodiments may include a method, including: receiving, by a point of presence (POP) of a mobile accelerator system, traffic associated with a content server, wherein the traffic uses a port associated with a predefined protocol; determining, by the POP and based on accessing a dynamic filter, whether the content server has been associated with traffic that fails to use the predefined protocol, wherein the dynamic filter defines a list of content servers that have been associated with traffic that uses the port but fails to use the predefined protocol; in response to determining that the content server has not been associated with traffic that fails to use the predefined protocol, and by the POP: analyzing the traffic to determine whether the traffic currently is using the predefined protocol; and in response to determining that the traffic currently fails to use the predefined protocol, updating the dynamic filter such that the content server is associated with traffic that fails to use the predefined protocol.

In some embodiments, the dynamic filter may define a time to live (TTL) associated with of the content servers. Determining, based on accessing the dynamic filter, whether the content server has been associated with traffic that fails to use the predefined protocol may include determining, based on accessing the dynamic filter, whether a TTL associated with the content server has lapsed. Updating the dynamic filter such that the content server is associated with traffic that fails to use the predefined protocol may include updating the dynamic filter such that a new TTL is associated with the content server.

In some embodiments, the method may further include, by the POP and in response to determining that the traffic currently fails to use the predefined protocol, route data transfers between the mobile device and second content server to bypass the mobile accelerator system.

In some embodiments, the method may further include, by the POP and in response to determining that the traffic currently is using the predefined protocol: optimizing the traffic based on the predefined protocol; determining a dynamic path between the mobile device and the content server through the proxy server; and routing data transfers between the mobile device and the content server through the dynamic path.

In some embodiments, the POP may be an entry POP. The dynamic path may include the entry POP and an exit POP. The mobile accelerator system may include a plurality of interconnected POPs including the entry POP and the exit POP.

In some embodiments, the method may further include, by the POP, receiving second traffic associated with a second content server, wherein the second traffic utilizes the port associated with the predefined protocol; determining, based on accessing the dynamic filter, whether the second content server has been associated with traffic that fails to use the predefined protocol; in response to determining that the second content server has been associated with traffic that fails to use the predefined protocol, routing data transfers between the mobile device and the second content server to bypass the mobile accelerator system without analyzing the second traffic to determine whether the second traffic currently is using the predefined protocol.

In some embodiments, the method may further include, by a virtual private network (VPN) server of the POP: creating a dedicated transport channel with a mobile device; receiving the traffic associated with the content server from the mobile device via the dedicated transport channel; determining whether the traffic is utilizing the port associated with the predefined protocol; and in response to determining that the traffic is utilizing the port associated with the predefined protocol, sending the traffic to a proxy server of the POP.

In some embodiments, analyzing the traffic to determine whether the traffic currently is using the predefined protocol may include parsing the traffic.

In some embodiments, the port may be a transmission control protocol (TCP) port 80. The predefined protocol may be hypertext transfer protocol (HTTP). In some embodiments, the port may be a transmission control protocol (TCP) port 443. The predefined protocol may be secure hypertext transfer protocol (HTTPS).

In some embodiments, the dynamic filter may include a data entry associated with the content server, the data entry including an internet protocol (IP) prefix, a netmask, the port, and a TTL.

These characteristics as well as additional features, functions, and details of various embodiments are described below. Similarly, corresponding and additional embodiments are also described below.

BRIEF DESCRIPTION OF THE DRAWINGS

Figure 1:
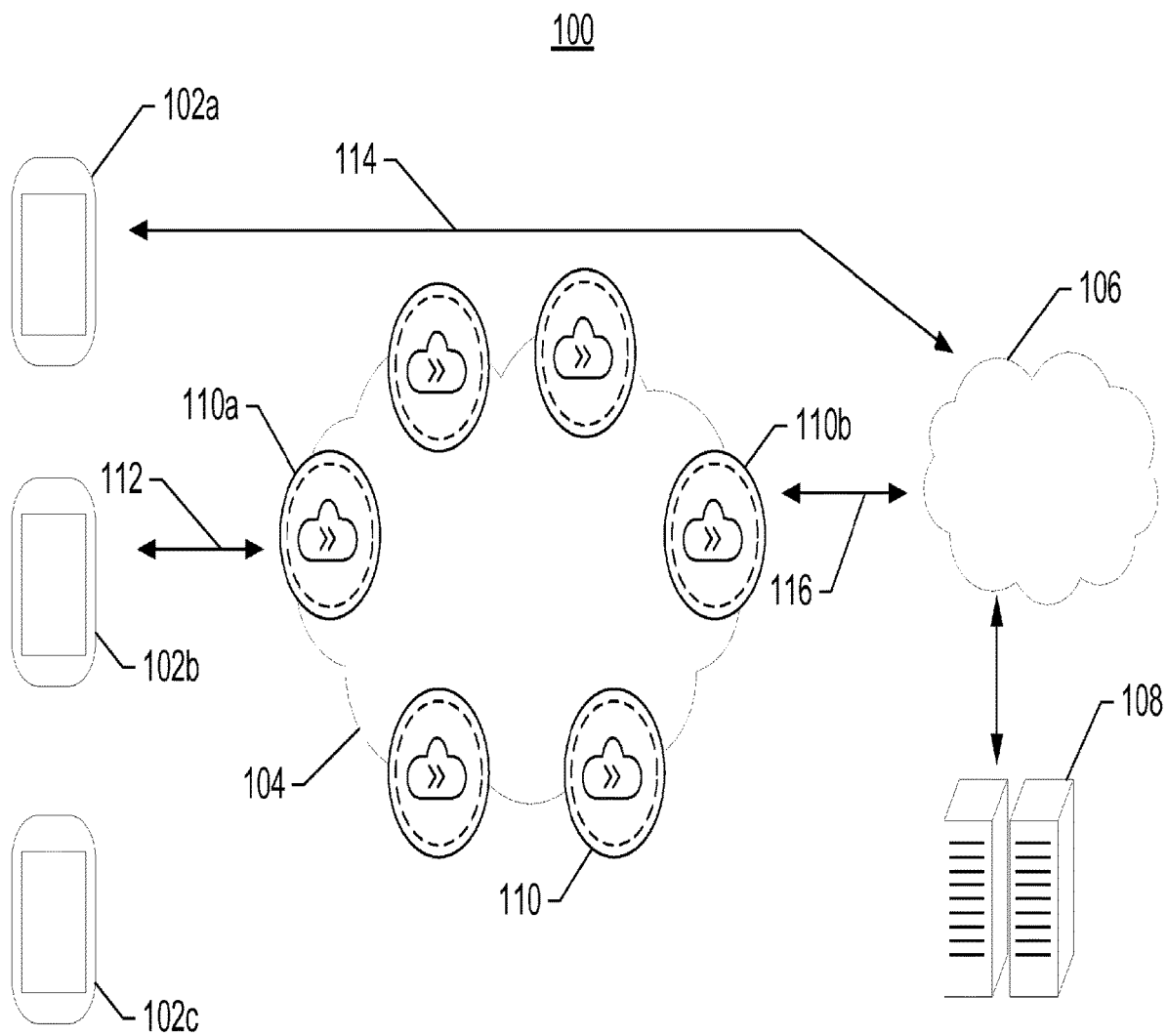
Figure 2:
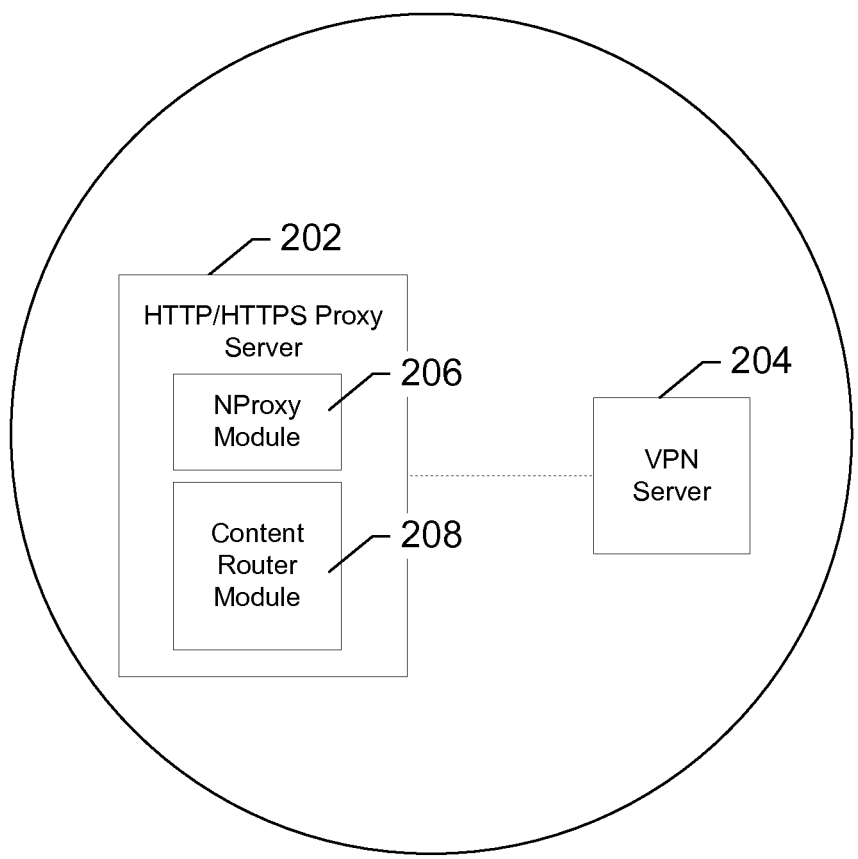
Figure 3:
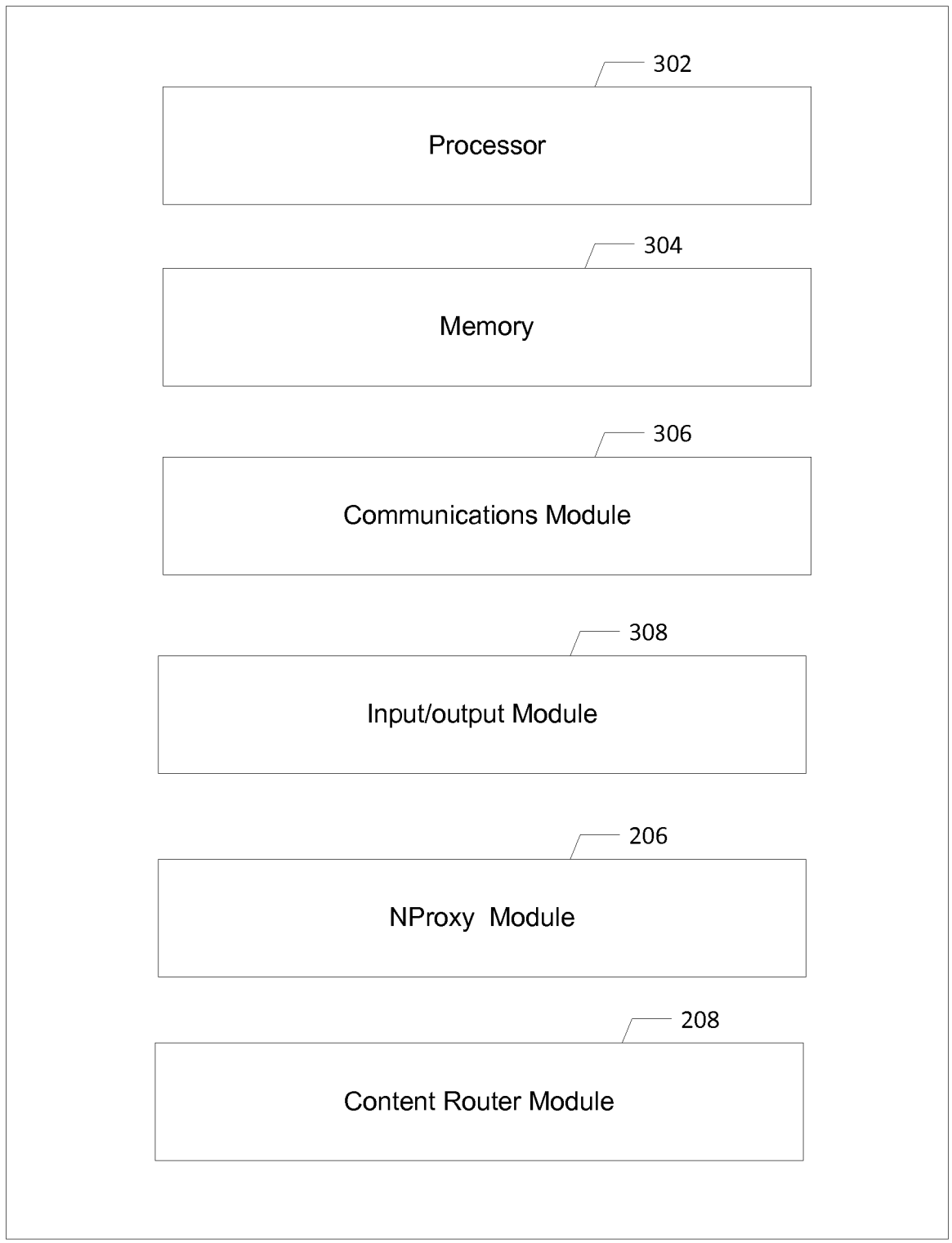
Figure 5:
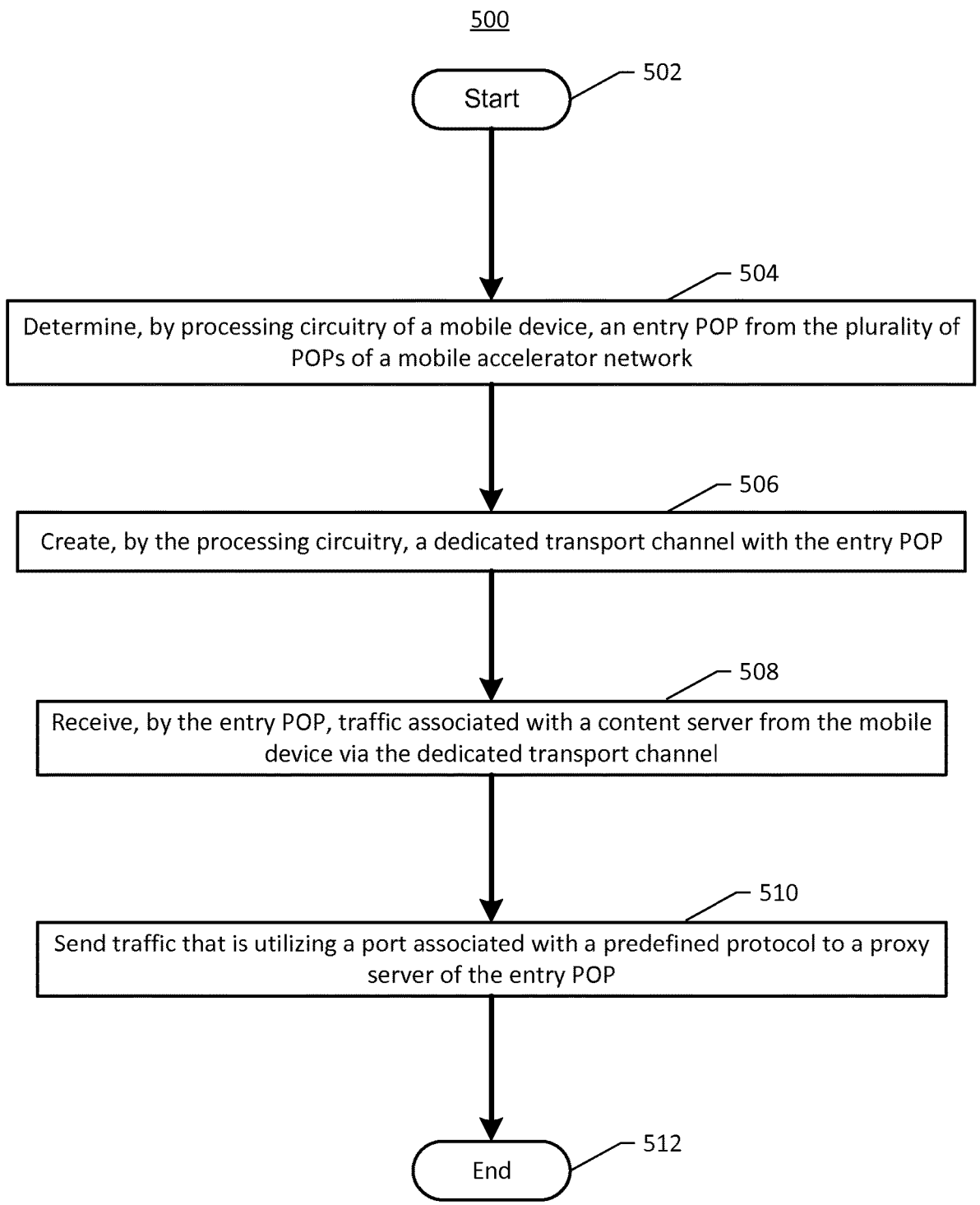
Figure 6:
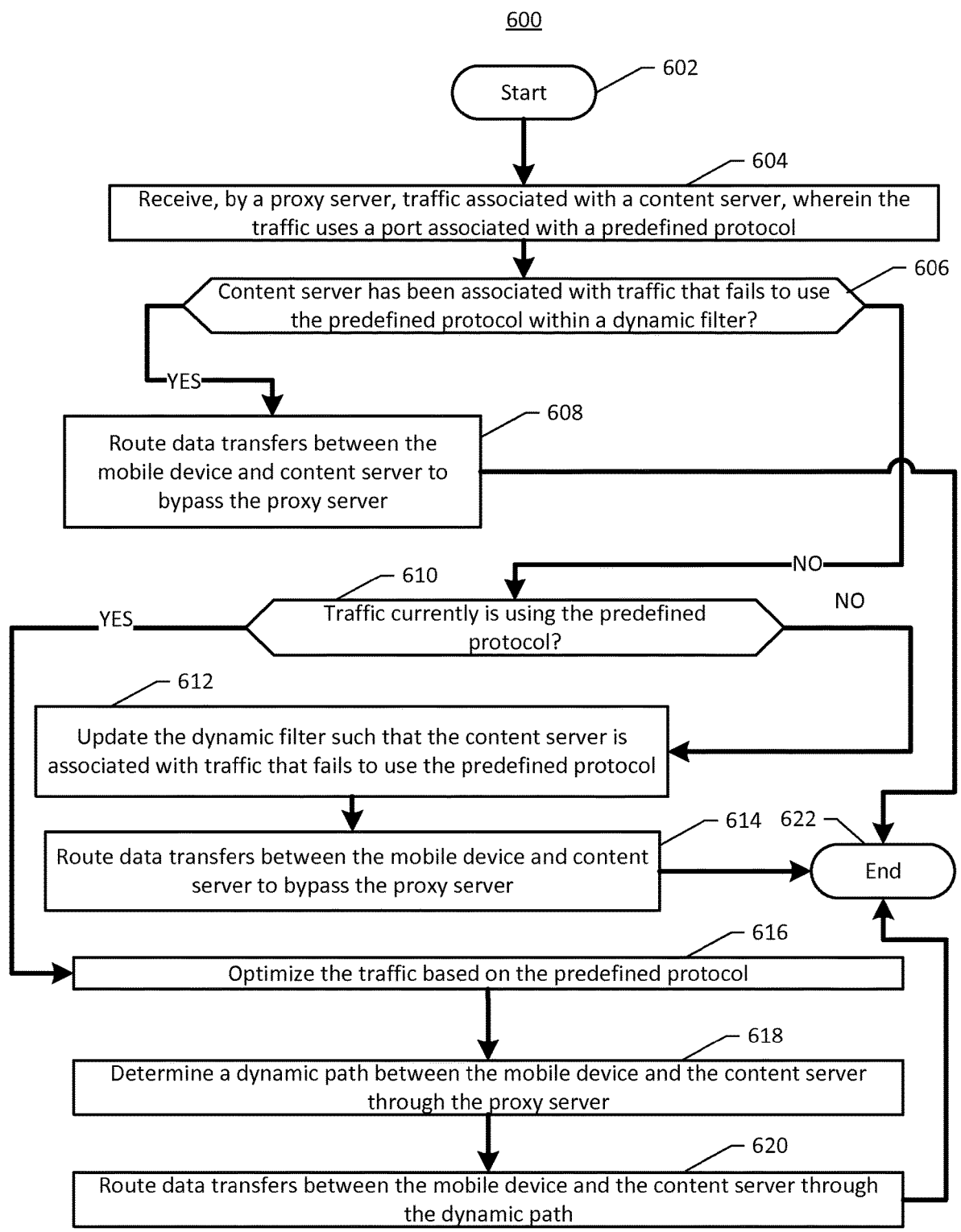

Having thus described some embodiments in general terms, reference will now be made to the accompanying drawings, which are not necessarily drawn to scale, and wherein:

FIG. 1 shows an example of a system, in accordance with some embodiments;

FIG. 2 shows an example of a point of presence (POP) of a mobile accelerator system, in accordance with some embodiments, in accordance with some embodiments;

FIG. 3 shows a schematic block diagram of example circuitry, in accordance with some embodiments;

FIG. 4 shows an example of a dynamic filter, in accordance with some embodiments;

FIG. 5 shows an example of a method of establishing a connection between a mobile device and an entry POP of a mobile accelerator system, performed in accordance with some embodiments; and FIG. 6 shows an example of a method 600 of dynamic routing for data transfers between a mobile device and a content server, performed in accordance with some embodiments.

DETAILED DESCRIPTION

Embodiments will be described more fully hereinafter with reference to the accompanying drawings, in which some, but not all embodiments contemplated herein are shown. Indeed, various embodiments may be implemented in many different forms and should not be construed as limited to the embodiments set forth herein; rather, these embodiments are provided so that this disclosure will satisfy applicable legal requirements. Like numbers refer to like elements throughout.

A mobile accelerator system including a multiple point-of-presences (POPs) provides for mobile device content delivery acceleration. The POPs may be located at different geographical locations to provide a collection of access points to the Internet from the different geographical locations. A mobile device may form a dedicated transport channel with a fastest (e.g., based on synthetic latency) POP of the mobile accelerator system, or entry POP. The entry POP may then be configured to route data transfers between the mobile device and the content server through one or more POPs of the mobile accelerator system. Based on a dynamic path determination that optimizes connection quality measures such as synthetic latency, the data transfers may be routed from the mobile device, through the mobile accelerator system (e.g., to an entry POP via the dedicated transport channel, and then to a fastest exit POP), and then to the content server.

The data traffic transferred between POPs within the mobile accelerator system may be optimized using various techniques such as compression, aggressive congestion control, large window size, etc. However, not all types of data or traffic may be optimized using the various techniques. For example, mobile applications (e.g., messaging applications)

may use custom protocols for Transmission Control Protocol (TCP) port 80 (e.g., well-known to use the Hypertext Transfer Protocol (HTTP)) or port 443 (e.g., well-known to use the Hypertext Transfer Protocol Secure (HTTPS)) to avoid mobile network issues such as filtering, rate limiting, caching device, etc. These custom protocols may be different from the HTTP or HTTPS protocols that are well-known or standards for the ports 80 or 433, respectively. Therefore, the some or all of the optimization techniques used for HTTP or HTTPs traffic may not be suitable for the custom protocol traffic.

Some embodiments may provide for intelligent routing of mobile device traffic that use custom protocols, or protocols that are otherwise are unsuitable for optimization. For example, after a mobile device connects with the mobile accelerator system through an entry POP, the entry POP of the mobile accelerator system may be configured to analyze the traffic to determine whether the traffic is suitable for being optimized. This may include parsing the traffic on ports 80 or 433 to determine whether it is HTTP or HTTPS traffic, respectively, which can be optimized. For traffic that cannot be optimized, the entry POP may be configured to route data transfers between the mobile device and the content server without traversing the mobile accelerator system. For traffic that can be optimized, the entry POP may be configured to determine a dynamic (e.g., optimized) path through the mobile accelerator system, and route data transfers between the mobile device and the content server through the dynamic path. Furthermore, the traffic through the mobile accelerator system (e.g., from an entry POP to an exit POP) may be optimized using compression, aggressive congestion control, large window size, etc. In some embodiments, each POP of the mobile accelerator system (e.g., including mobile device POPs) may be configured to perform the functionality discussed herein with respect to the entry POP, such that different POPs may operate as entry or exit POPs to provide improved traffic routing between various mobile devices and content servers.

Some embodiments may include techniques for efficient bypass of the mobile accelerator system and/or traffic analysis when traffic is reliably known to be unsuitable for optimization. For example, the entry POP of the mobile accelerator network may include an HTTP/HTTPS proxy server including an entry proxy ("NProxy") module. The NProxy module may be configured to receive traffic associated with the content server (e.g., transferred between the mobile device and the content server), and to determine whether the traffic is suitable for being optimized, such as based on parsing the traffic. To increase efficiency, the NProxy module may be configured to implement a dynamic filter defining a listing of content server addresses (e.g., by internet protocol (IP) prefix) for content servers associated with traffic that is not suitable for being optimized, and may update the dynamic filter when appropriate.

For example, each content server listed by the dynamic filter may be associated with a time to live (TTL) indicating how long the analysis (e.g., via parsing) of the traffic associated with the content server remains valid. Upon expiration of the TTL for a content server, the NProxy module may be configured to refresh the listing, such as by performing another check of the traffic associated with the content server. Based on the check, the dynamic filter may be updated accordingly.

When the entry POP (e.g., a VPN server, switch, etc.) receives traffic associated with the content server, the NPRoxy module of the proxy server may check the dynamic filter for the content server, and the NProxy module may route the traffic based on the dynamic filter entries without requiring additional parsing or other analysis of the traffic for optimization suitability (e.g., so long as the TTL has not lapsed). For example, the data transfers may be routed directly between the mobile device and the content server (e.g., without traversing though the POPs of the mobile accelerator network). Alternatively, when the entry POP accelerator receives traffic that is not associated with any content server of the dynamic filter, the NProxy module may parse the traffic, and if the traffic can be optimized (e.g., traffic uses HTTP or HTTPS protocol), then the data transfers may be routed through a dynamic path of the mobile accelerator system.

Advantageously, various components and processing steps of the mobile accelerator system (e.g., POPs, proxy servers, etc.) may be efficiently bypassed for data transfers that would not be improved or optimized by the mobile accelerator system. Data transfer speeds of the mobile accelerator system is improved because the dedicated transport channels between POPs are less congested by the traffic that cannot be optimized, and thus increasing system bandwidth for optimized traffic.

Exemplary Architecture

FIG. 1 shows an example system 100 in accordance with some embodiments. System 100 may include one or more mobile devices 102 (e.g., mobile devices 102a-102c), mobile accelerator system 104, network 106, and content server 108. As discussed in greater detail below, a mobile device 102 may be connected with content server 108 via one or more of mobile accelerator system 104 and network 106 to provide content delivery acceleration between content server 108 and mobile device 102.

Mobile devices 102a-102b may each be associated with a user. Although three mobile devices are shown in FIG. 1, system 100 may include any number of mobile devices that may be associated with various other users. Mobile device 102 may include a cellular telephone (including smartphones and/or other types of mobile telephones), tablet, laptop, electronic reader, e-book device, media device, and/or or the like. In some embodiments, some or all of the techniques discussed herein with respect to mobile device 102 and mobile acceleration may be applicable to a stationary device, such as a desktop computer, terminal, work station, server, among other things.

Mobile accelerator system 104 may include a plurality of point of presences, or POPs 110. A "POP," as used herein, refers to one or more servers, routers, Asynchronous Transfer Mode (ATM) switches, digital/analog call aggregators, etc. that provide an access point to network 106 (e.g., the Internet). Although shown as being separate from network 106, in some embodiments, the mobile accelerator system 104 may supported by an Internet backbone provided by the network 106. The mobile device 102 may include a content router module and/or circuitry configured to determine the entry POP 110a and facilitate the creation of a dedicated transport channel (e.g., a wireless virtual private network (VPN) tunnel) with the entry POP 110a via the connection 112. In some embodiments, a single POP 110 may include multiple servers, and load balancing algorithms may be used to balance traffic between the multiple servers of the POP 110.

Each of the POPs 110 may be connected with each other and located at different geographical locations to provide a collection of access points to network 106 from the different geographical locations. For example, in a six POP mobile accelerator system 104, interconnected POPs 110 may be located in Singapore, Seoul, San Francisco, Tokyo, Dallas, and New York to form the mobile accelerator system 104.

FIG. 2 shows an example of a POP 110, in accordance with some embodiments. With reference to FIGS. 1 and 2, POP 110 may include an (e.g., HTTP/HTTPS) proxy server 202 and a virtual private network (VPN) server 204. The proxy server 202 may include an NProxy module 206 and a content router module 208. In various embodiments, the NProxy module 206 and/or content router module 208 may be separate from the proxy server 202, such as on one or more other servers of the POP 110.

When the POP 110 is an entry POP, the NProxy module 206 may be configured to receive traffic transferred between a mobile device 102 and a content server 108, and determine whether the traffic can be optimized by the mobile accelerator system, as discussed in greater detail herein. The NProxy module 206 may be further configured to route traffic that cannot be optimized between the consumer device 102 and the content server 108 directly (e.g., via Internet network 106, and without traversing a POP 110 of the mobile accelerator system 104). For traffic that can be optimized, the NProxy module 208 may be configured to route the traffic based on a dynamic path that include may include the proxy server 202 of the POP 110, as well as one or more other POPs 110 of the mobile accelerator system 104, or some other optimized path.

In some embodiments, the NProxy module 206 may be configured to maintain a dynamic filter including a listing of content servers 108 associated with data that cannot be optimized. In some embodiments, the dynamic filter may be defined by software to provide improved flexibility of configurations, and real-time updates. Here, the dynamic filter may be referred to as a Software Defined Dynamic Filter (SDDFilter). The SDDFilter may reside in a memory of the proxy server 202 for faster lookup, but may additionally or alternatively be stored in a separate database or other storage medium.

With reference to FIG. 4, dynamic filter 400 may include data associated with content servers. In particular, each entry represents an internet protocol (IP) prefix 402 (e.g., incorporating multiple IP addresses, as discussed in greater detail below) and an associated netmask 404, TCP port 406, and time to live (TTL) 408. Rather than determining whether the traffic can be optimized each time the content server 108 is accessed, the NProxy module 206 may reference the dynamic filter to provide efficient data transfer bypass of the proxy server 202 for data transfers between mobile devices 102 and the content server 206. Each listed content server 108 of the dynamic filter (e.g., based on IP prefix 402) may be associated with a time to live (TTL) 408, defining a period of time within which a determination as to whether traffic associated with the content server 108 can be optimized remains valid or usable. Subsequent to lapse of the TTL 408, the NProxy module 208 may be configured to recheck whether the traffic can be optimized by the mobile accelerator system, and update the dynamic filter 400 accordingly. Subsequent data routing associated with the content server 208 may then be performed based on the updated dynamic filter 400.

The content router module 208 may be configured to determine dynamic paths between the mobile device 102 and the content server 208. When traffic can be optimized, the NProxy module 206 may be configured to query the content router module 208 using a content server 108 address (e.g., IP address) to receive a dynamic path for routing data transfers. To determine the dynamic path, the content router module 208 of an entry POP 110a may be configured to determine another POP 110 of the mobile accelerator system 104 as an exit POP 110b, such as based on exit POP 110b providing the fastest direct connection access point to the content server 108. The content router module 208 may be further configured to determine the dynamic path as including the entry POP 110a and the exit POP 110.

In some embodiments, the dynamic path may include one or more intervening other POPs 110 between the entry POP 110a and the exit POP 110b. In some embodiments, the dynamic path may include only the entry POP 110a, and data transfers may be routed from the proxy server 202 of the entry POP 110a to the content server 108 via the Internet network 106 (e.g., without traversing a second, exit POP 110 of the mobile accelerator network 104). In general, the dynamic path may be an optimized path through at least one POP 110 of the mobile accelerator system 104 that is programmatically selected based on data transfer speed (e.g., as measured by synthetic latencies).

In various embodiments, the content router module 208 may be located in one or more components of system 100 to perform dynamic path determination. For example, the content router module 208 may be located in mobile device 102 to find an optimized entry POP. In another example, the content router module 208 may be located in another component of the POP 110, such as the VPN server 204 or a separate server.

The VPN server 204 of the POP 110 may be configured to create a dedicated transport channel with a mobile device 102 when the POP 110 is acting as an entry POP for data transfers. In some embodiments, the VPN server 204 and/or a switch, router, or the like, of the POP 110 may be configured to send traffic that is utilizing a port associated with a predefined protocol to the proxy server for determinations with respect to whether the traffic can be optimized and suitable routing. For example, upon receipt of traffic from the mobile device 102 via the dedicated transport channel, the VPN server 204 may be configured to forward the traffic going to port 80 (HTTP) and 443 (HTTPS) to the proxy server 202. Here, the proxy server 202 may be configured to analyze the traffic, manage the dynamic filter, and route data transfers for ports 80 and 443, and thus the proxy server 202 is referred to as an HTTP/HTTPS proxy server. In some embodiments, the VPN server 204 and the proxy server 202 may be implemented on shared hardware, such as a single server or distributed across one or more servers of the POP 110.

The dedicated transport channel of the VPN may include a layer 3 tunnel, and the mobile device 102 and VPN server 204 may (e.g., optionally) exchange encryption keys. Once connected, internet protocol (IP) traffic from the mobile device 102 or device POP will be sent to the connected VPN server 204 of the entry POP 110a. When suitable, the traffic may further be optimized using various techniques such as data compression (e.g., dictionary based compression), TCP optimization (e.g., initcwind, aggressive congestion control, large window size, etc.), HTTP optimization (e.g., caching, front-end optimization for HTTP traffic), HTTPS optimization, among other things.

With reference to FIG. 1, the mobile device 102 may connect with an entry POP 110a of the mobile accelerator system 104 via connection 112. Connection 112 may include a wireless connection utilizing Wi-Fi and/or mobile broadband technologies (e.g., 2G, 3G, and/or long-term evolution (LTE), etc.). In some embodiments, connection 112 may additionally or alternatively include a wired connection, such as Ethernet, universal serial bus (USB), wired broadband, etc. The connection 112 may represent a "last mile" or final leg of the system 100 for content delivery from content server 108 to the mobile device 102.

In some embodiments, a mobile device 102 and/or entry POP 110a may be configured to optimize the connection between the mobile device 102 and the entry POP 110a. In addition to selecting the entry POP 110a and facilitating connections with the entry POP 110a, for example, the mobile device 102 may be further configured to provide various functionality such as user authentication, encryption for data transfers to the entry POP 110a, data compression (e.g., dictionary based compression), user datagram protocol (UDP) optimization, transport layer security (TLS) optimization, transmission control protocol (TCP) optimization, and/or hypertext transfer protocol (HTTP) optimization. The connection between the mobile device 102 and the entry POP 110a may be further configured to facilitate data routing, such as through Layer 3 and/or Layer 4 switches. In some embodiments, a mobile device 102 may also include a POP or be a POP 110 of the mobile accelerator system 104. For example, a mobile device 102 may include a content router module 208 as discussed herein for a POP 110, and may be referred to as device POP. Furthermore, the mobile device 102 may be further configured to perform POP functionality with respect to data routing, such as by serving as intervening POP 110 of the mobile accelerator system 104 for a connection between a second mobile device 102 and a second content server 108.

The content server 108 and the network 106 may be connected with an exit POP 110b of the mobile accelerator system 104 via a connection 116. In general, dynamic paths may be determined based on scoring and ranking the various available paths between the mobile device 102 and content server 108.

The content server 108 may be an original host of content, or alternatively, may be a dedicated content delivery server or other redundant host. For example, the content server 108 may be one or multiple content delivery servers of a content delivery network (CDN). In some embodiments, such as when content is available from multiple content servers, the content server 108 may be determined as a nearest content server capable of providing the content to the mobile device 102 and/or a POP 110 (e.g., such as based on a domain name service (DNS) lookup for a uniform resource locator (URL) reference to the desired content). In some embodiments, content server 108 may be a user device, such as a mobile device 102 configured to provide content delivery via the network 106.

In some embodiments, when traffic is susceptible to traffic optimization, the dynamic paths between POPs 110 (e.g., the entry POP 110a and the exit POP 110b) may be supported by traffic optimization techniques such transmission control protocol (TCP) optimization (e.g., for a long haul network), HTTP/HTTPS optimization (e.g., caching, front-end optimization), data compression (e.g., dictionary based compression), encryption for data transfers to the mobile device 102, connection pooling, and/or HTTP keep-alive. The connection between the POPs 110 may be further configured to facilitate data routing, such as through Layer 4 switches.

In some embodiments, the content router module 208 (e.g. of a POP 110, such as entry POP 110a, and/or the mobile device 102) may be configured to determine the exit POP 110b and facilitate the routing of data transfers between the mobile device 102 and the content server 108 through the exit POP 110b. The connection 116 may include a "first mile" or first leg of the system 100 for content delivery from content server 108 to the mobile device 102. In some embodiments, the connections between the exit POP 110b and content servers 108 may be supported with various functionality such TCP optimization, connection pooling, and HTTP keep-alive.

In addition to optimization of the last mile and file mile connections, the content router module 208 (e.g., of the mobile device and/or entry POP 110a) may further be configured to determine POP-to-POP scores between the POPs 110 of the mobile accelerator system 104. The connection between the entry POP 110 and the exit POP 110b may represent "middle mile" or middle leg of the system 100.

In some embodiments, the content router module 208 may be configured to determine POP connection scores to generate a dynamic path ranking. A "POP connection score," as used herein, refers to a measure of the quality of the entire path (e.g., including the first mile, middle mile, and last mile) between the mobile device 102 and the content server 108 through the mobile accelerator system 104. In some examples, the path through the mobile accelerator system 104 may include the entry POP 110a and the exit POP 110b. Here, the POP connection score may be determined based on an entry POP score between mobile device 102 and entry POP 110a, a POP-to-POP score between entry POP 110a and exit POP 110b, and an exit POP score between exit POP 110b and content server 108. In another example, the path through the mobile accelerator system 104 may include only a single entry/exit POP that serves as both the entry POP and the exit POP. Here, the POP connection score may be determined based on an entry POP score between mobile device 102 and the entry/exit POP 110, and an exit POP score between entry/exit POP 110 and the content server 108.

In addition or alternative to connections through between the mobile device 102 and the content server 108 between the mobile accelerator system 104, system 100 may provide for a direct connection between the mobile device 102 and the content server 108 through network 106, bypassing the mobile accelerator system 104 when suitable. For example, the NProxy module 206 may be configured to route data transfers as such when the dynamic filter indicates that the content server 108 is associated with data that cannot be optimized. In another example, the content router module 208 of the mobile device 102 and/or POP 110 may be configured to determine a "direct connection score," which as used herein, refers to a measure of the quality of the connection between the mobile device 102 and the content server 108 through network 106 and without traversing the mobile accelerator system 104. The techniques discussed herein for determining the POP scores may be applicable to the direct connection score. For example, the direct connection score may be determined based on synthetic latency between the mobile device 102 and content server 106 through the network 106 via connection 114 (e.g., rather than the mobile accelerator system 104). As such, the mobile device 102 may provide or otherwise behave like a POP, providing an access point to the Internet via the direct connection 114. Connection 114, like connection 112, may represent the last mile for system 100, and may include a wireless connection utilizing Wi-Fi and/or mobile broadband technologies and/or a wired connection.

Additional details regarding dynamic path scoring and routing within a mobile accelerator system, applicable in various embodiments, are discussed in U.S. patent application Ser. No. 14/644,116, titled "MOBILE ACCELERATOR," filed Mar. 10, 2015, which is hereby incorporated by reference in its entirety.

Network 106 may include a public network such as the Internet. Network 106 may include one or more wired and/or wireless communication networks including, for example, a wired or wireless local area network (LAN), personal area network (PAN), metropolitan area network (MAN), wide area network (WAN), or the like, as well as any hardware, software and/or firmware for implementing the one or more networks (such as, e.g., network routers, switches, hubs, etc.). For example, network 106 may include a cellular telephone, mobile broadband, long term evolution (LTE), GSM/EDGE, UMTS/HSPA, IEEE 802.11, IEEE 802.16, IEEE 802.20, Wi-Fi, dial-up, and/or Wi-Max network. Furthermore, network 106 may include a public network (e.g., the Internet), a private network (e.g., the network associated with the mobile accelerator system 104), and/or combinations thereof, and may utilize a variety of networking protocols now available or later developed including, but not limited to TCP/IP based networking protocols.

FIG. 3 shows a schematic block diagram of example circuitry 300, some or all of which may be included in a mobile device 102 and/or a POP 110 (e.g., proxy server 202, VPN server 204) of the mobile accelerator system 104. In accordance with some example embodiments, circuitry 300 may include various means for performing some or all of the functionality discussed herein, such as one or more processors 302, memories 304, communications modules 306, input/output modules 308, NProxy module 206, and/or content router module 208.

In some embodiments, such as when circuitry 300 is included the mobile device 102 and/or a POP 110 (e.g., a server of the POP 110), the NProxy module 206 and/or content router module 208 may also or instead be included. As referred to herein, "module" includes hardware, software and/or firmware configured to perform one or more particular functions. In this regard, the means of circuitry 300 as described herein may be embodied as, for example, circuitry, hardware elements (e.g., a suitably programmed processor, combinational logic circuit, integrated circuit, and/or the like), a computer program product comprising computer-readable program instructions stored on a non-transitory computer-readable medium (e.g., memory 304) that is executable by a suitably configured processing device (e.g., processor 302), or some combination thereof.

Processor 302 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 3 as a single processor, in some embodiments, processor 302 may comprise a plurality of processing components or means. The plurality of processing components may be embodied on a single computing device or may be distributed across a plurality of computing devices collectively configured to function as circuitry 300. The plurality of processing components may be in operative communication with each other and may be collectively configured to perform one or more functionalities of circuitry 300 as described herein. In an example embodiment, processor 302 may be configured to execute instructions stored in memory 304 or otherwise accessible to processor 302. These instructions, when executed by processor 302, may cause circuitry 300 to perform one or more of the functionalities described herein such as with respect to methods 500 and 600 shown in FIGS. 5 and 6 respectively.

Whether configured by hardware, firmware/software methods, or by a combination thereof, processor 302 may comprise an entity capable of performing operations according to embodiments of the present invention while configured accordingly. Thus, for example, when processor 302 is embodied as an ASIC, FPGA or the like, processor 302 may comprise specifically configured hardware for conducting one or more operations described herein. As another example, when processor 302 may be embodied as an executor of instructions, such as may be stored in memory 304, the instructions may specifically configure processor 302 to perform one or more algorithms, methods or operations described herein. For example, processor 302 may be configured to execute operating system applications, firmware applications, media playback applications, media editing applications, among other things.

Memory 304 may comprise, for example, volatile memory, non-volatile memory, or some combination thereof. Although illustrated in FIG. 3 as a single memory, memory 304 may comprise a plurality of memory components. The plurality of memory components may be embodied on a single computing component or distributed across a plurality of computing components. In various embodiments, memory 304 may comprise, for example, a hard disk, random access memory, cache memory, flash memory, a compact disc read only memory (CD-ROM), solid state memory, digital versatile disc read only memory (DVD-ROM), an optical disc, circuitry configured to store information, integrated circuitry, chemical/biological memory, paper, or some combination thereof. Memory 304 may be configured to store information, data, applications, instructions, or the like for enabling circuitry 300 to carry out various functions in accordance with example embodiments discussed herein. For example, in at least some embodiments, memory 304 may be configured to buffer input data for processing by processor 302. Additionally or alternatively, in at least some embodiments, memory 304 may be configured to store program instructions for execution by processor 302 and/or data for processing by processor 302. Memory 304 may store information in the form of static and/or dynamic information. This stored information may be stored and/or used by circuitry 300 during the course of performing its functionalities.

Communications module 306 may be embodied as any component or means embodied in circuitry, hardware, a computer program product comprising computer readable program instructions stored on a computer readable medium (e.g., memory 304) and executed by a processing device (e.g., processor 302), or a combination thereof that is configured to receive and/or transmit data from/to another device, such as, for example, a second circuitry 300 or other computing device. In some embodiments, communications module 306 (like other components discussed herein) can be at least partially embodied as or otherwise controlled by processor 302. In this regard, communications module 306 may be in communication with processor 302, such as via a bus. Communications module 306 may include, for example, an antenna, a transmitter, a receiver, a transceiver, network interface card and/or supporting hardware and/or firmware/software for enabling communications. Communications module 306 may be configured to receive and/or transmit any data that may be stored by memory 304 using any protocol that may be used for communications. Communications module 306 may additionally and/or alternatively be in communication with the memory 304, input/output module 308 and/or any other component of circuitry 300, such as via a bus. Communications module 306 may be configured to use one or more communications protocols such as, for example, Wi-Fi (e.g., a 802.11 protocol, etc.), Bluetooth, radio frequency systems (e.g., 900 MHz, 1.4 GHz, and 5.6 GHz communication systems), infrared, GSM, GSM plus EDGE, CDMA, 2G, 3G, LTE, mobile broadband, and other cellular protocols, VOIP, or any other suitable protocol.

Input/output module 308 may be in communication with processor 302 to receive an indication of an input and/or to provide an audible, visual, mechanical, or other output. Some example inputs discussed herein may include user inputs for interacting with remote content servers, as well as for user inputs that configure parameters or settings of mobile acceleration. In that sense, input/output module 308 may include means for performing analog-to-digital and/or digital-to-analog data conversions. Input/output module 308 may include support, for example, for a display, touch sensor, touch screen, keyboard, button, click wheel, mouse, joystick, an image capturing device, microphone, speaker, biometric scanner, camera, motion sensor, and/or other input/output mechanisms. In embodiments where circuitry 300 may be implemented as a POP, server or database, aspects of input/output module 308 may be reduced as compared to embodiments where circuitry 300 may be implemented as an end-user machine or other type of device designed for complex user interactions (e.g., mobile device 102). In some embodiments (like other components discussed herein), input/output module 308 may even be eliminated from circuitry 300. Alternatively, such as in embodiments wherein circuitry 300 is embodied as a server or database, at least some aspects of input/output module 308 may be embodied on a mobile device used by a user that is in communication with circuitry 300. Input/output module 308 may be in communication with memory 304, communications module 306, and/or any other component(s), such as via a bus. Although more than one input/output module and/or other component can be included in circuitry 300, only one is shown in FIG. 3 to avoid overcomplicating the disclosure (e.g., like the other components discussed herein).

In some embodiments, NProxy module 206 may also be included to perform the functionality discussed herein with respect to analyzing traffic, managing the dynamic filter, and routing traffic and/or the content router module 208 may also or instead be included and configured to perform the functionality discussed herein related determining optimal data transfer path and/or nodes. In some embodiments, some or all of the functionality of the NProxy module 206 and/or content router module 208 may be performed by processor 302. In this regard, the example processes and algorithms discussed herein can be performed by at least one processor 302, NProxy module 206, and/or content router module 208. For example, non-transitory computer readable storage media can be configured to store firmware, one or more application programs, and/or other software, which include instructions and other computer-readable program code portions that can be executed to control processors of the components of system 300 to implement various operations, including the examples shown above. As such, a series of computer-readable program code portions may be embodied in one or more computer program products and can be used, with a device, server, database, and/or other programmable apparatus, to produce the machine-implemented processes discussed herein.

Any such computer program instructions and/or other type of code may be loaded onto a computer, processor or other programmable apparatus's circuitry to produce a machine, such that the computer, processor other programmable circuitry that executes the code may be the means for implementing various functions, including those described herein. In some embodiments, one or more external systems (such as a remote cloud computing and/or data storage system) may also be leveraged to provide at least some of the functionality discussed herein.

As described above and as will be appreciated based on this disclosure, various embodiments may be implemented as methods, mediums, devices, servers, databases, systems, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD/DVD-ROMs, flash memory, optical storage devices, quantum storage devices, chemical storage devices, biological storage devices, magnetic storage devices, etc.

Embodiments have been described above with reference to block diagrams of components, such as functional modules, system components and circuitry. Below is a discussion of an example process flowcharts describing functionality that may be implemented by one or more components discussed above. Each block of the block diagrams and process flowcharts, and combinations of blocks diagrams and process flowcharts, respectively, can be implemented by various means including computer program instructions. These computer program instructions may be loaded onto a general purpose computer, special purpose computer, or other programmable data processing apparatus, such as processor 302, to produce a machine, such that the computer program product includes the instructions which execute on the computer or other programmable data processing apparatus to create a means for implementing the functions specified in the flowchart block or block diagrams.

These computer program instructions may also be stored in a computer-readable storage device (e.g., memory 304) that can direct a computer or other programmable data processing apparatus to function in a particular manner, such that the instructions stored in the computer-readable storage device produce an article of manufacture including computer-readable instructions for implementing the function discussed herein. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions discussed herein.

Accordingly, blocks of the block diagrams and flowchart illustrations support combinations of means for performing the specified functions, combinations of steps for performing the specified functions and program instruction means for performing the specified functions. It will also be understood that each block of the block diagrams and process flowcharts, and combinations of blocks in the block diagrams and process flowcharts, can be implemented by special purpose hardware-based computer systems that perform the specified functions or steps, or combinations of special purpose hardware and computer instructions.

Dynamic Filter

FIGS. 5 and 6 show flowcharts of example methods 500 and 600 related to using a dynamic filter to optimize mobile acceleration, respectively, in accordance with some embodiments. Most of the steps of methods 500 and 600 are generally discussed herein as being performed by components of system 100 discussed above. However, other suitable devices, apparatus, systems and/or circuitry may be used.

FIG. 5 shows an example of a method 500 of establishing a connection between a mobile device and an entry POP of a mobile accelerator system, performed in accordance with some embodiments. Method 500 may begin at 502 and proceed to 504, where processing circuitry of a mobile device 102 (e.g., a content router module 208) may be configured to determine an entry POP 110a from a plurality of POPs 110 of a mobile accelerator system 104. In some embodiments, the entry POP may be selected from the POPs 110 based on entry POP score, which may be determined based on a comparison of synthetic latencies between the mobile device 102 and the POPs 110 of the mobile accelerator system 104.

At 504, the mobile device 102 may be configured to create a dedicated transport channel tunnel with a VPN server 204 of an entry POP 110a. The dedicated transport channel may be created between the mobile device 102 and the VPN server 208 of the entry POP 110. The dedicated transport channel, for example, may include a virtual private network (VPN) tunnel. Additional details regarding the creation of the VPN is discussed in U.S. patent application Ser. No. 14/644,116, which is incorporated by reference above At 508, the VPN 204 server may be configured to receive traffic associated with a content server 108 from the mobile device 102 via the dedicated transport channel. In some embodiments, once the VPN is established, IP traffic from the mobile device (or device POP) may be associated with the content server 108 based on including a destination IP address (e.g., 11.22.33.44) of the content server 108. Furthermore, the traffic may include a destination port (e.g., port 80 or 443). For example, the mobile device 102 may be operating a messaging application, and the traffic may be message data that is to be sent to a messaging content server 108 that hosts the messaging application. Various mobile applications may be enhanced with server connectivity, and the entry POP 110a may receive such traffic between mobile devices and content servers via the dedicated transport channel.

At 510, the VPN server 204 may be configured to send traffic that is utilizing a port associated with a predefined protocol to a proxy server 202 of the entry POP 110. For example, the VPN server 204 may monitor the destination port associated with the traffic, and compare the destination port with a list of ports that are associated with predefined protocols. One example may include port 80 which is associated with the HTTP protocol. Another example may include port 443 which is associated with the HTTPS protocol. In some embodiments, the predefined protocols may include protocols that the mobile accelerator system 104 is capable of or configured to optimize. Here, the VPN server 204 may be configured to send traffic that is utilizing a port associated with protocol that the proxy server 204 is configured to optimize to the proxy server 204. In some embodiments, the VPN server 204 may be configured to send traffic using ports 80 and 443 to the proxy server 204.

In some embodiments, the VPN server 204 may be configured to not send traffic that fails to be utilizing a port associated with a predefined protocol to the proxy server 202. For example, traffic that is not for port 80 or 433 is not sent to the proxy server 202. Instead, the VPN server 204 may be configured to route data the transfers between the mobile device 102 and content server 108 to bypass the proxy server 202, such as directly to the Internet from the VPN server 204, and without traversing a second (e.g., exit) POP of the mobile accelerator system 104. Method 500 may then proceed to 512 and end.

FIG. 6 shows an example of a method 600 of dynamic routing for data transfers between a mobile device and a content server, performed in accordance with some embodiments. Method 600 may be performed to provide an efficient bypass for traffic that is not suitable for being optimized by the mobile accelerator system 104, based on the entry POP using and updating a dynamic filter defining a list of content servers that have been associated with port traffic that fails to use a predefined protocol of the port susceptible to optimization.

Method 600 may begin at 602 and proceed to 604, where a proxy server 202 may be configured to receive traffic associated with a content server 108, wherein the traffic uses a port associated with a predefined protocol. For example, the traffic may be received from the VPN server 204 as discussed at 510 of method 500. Here, the traffic may use port 80 or 443, respectively associated with the HTTP or HTTPS protocols. In another example, the traffic may be received from a switch, router, etc. of the entry POP 110 that is configured to forward port 80 or port 443 traffic. While port 80 and port 443 traffic, and their associated HTTP and HTTPS protocols, are discussed in greater detail herein, it is appreciated that other ports and associated protocols may also be used.

At 606, the proxy server 202 (e.g., an NProxy module 206 executing on the proxy server 202) may be configured to determine, based on a dynamic filter, whether the content server 108 has been (e.g. previously) associated with traffic that fails to use the predefined protocol of the port. With reference to FIG. 4, dynamic filter 400 includes entries 410 and 412 defining content servers (e.g., as referenced by IP prefix) that have been associated with traffic that uses port 80 or port 443, but fails to use the associated predefined protocols of the ports.

The proxy server 202 may be configured to analyze the traffic to determine the destination IP address of the content server 208, and may be further configured to compare the destination IP address with the IP prefixes 410 and 412 of the dynamic filter 400 to determine whether the content server 208 is included within the dynamic filter. For example, if the IP address of the content server 208 is 11.22.33.44, then the content server 108 may be determined as being included within the dynamic filter based on entry 410 having the IP prefix 11.22.33.0 and Netmask /24. As such, the content server 108 may be determined as having been (e.g. previously) associated with traffic that fails to use the predefined protocol of the port. In another example, if the IP address of the content server 108 is 44.33.22.11, then neither of the IP prefixes associated with the entries 410 and 412 include the content server 108, and the content server 108 may be determined as failing to be included within the dynamic filter. As such, the content server 108 may be determined has having not been associated with traffic that fails to use the predefined protocol of the port.

In some embodiments, each entry 410 and 412 (and thus content servers 108) of the dynamic filter 400 may be associated with a TTL 408 defining a time period within which the entry is valid or usable. The proxy server 202 may be configured to determine, based on accessing the dynamic filter 400, whether a TTL 408 associated with the content server 108 has lapsed. Here, a lapsed entry may be discarded or not used, or may trigger a subsequent analysis.

In response to determining, based on the dynamic filter, that the content server 208 has been associated with traffic that fails to use the predefined protocol of the port, method 600 may proceed to 608, where the proxy server 202 may be configured to route data transfers between the mobile device 102 and the content server 108 to bypass the proxy server 202. The data transfer is thus routed to bypass the mobile accelerator system 104 because the proxy server 202 is on the entry POP 110a of the mobile accelerator system 104 for the mobile device 102.

For example, the data transfers may be routed from the mobile device 102, through connection 114, to the network 106 (e.g., the Internet), and to the content server 108, and without traversing any POP 110 of the mobile accelerator system 104. In another example, the data transfers may be routed from the mobile device 102 via VPN connection 112 to the VPN server 204 of the entry POP 110a, and then outside of the mobile accelerator system (e.g., without traversing the proxy server 202 or another POP 110) to the network 106 (e.g., the Internet), and then to the content server 108. Advantageously, the traffic that fails to the use a recognized protocol, and thus are capable of being optimized by the mobile accelerator system 104, does not contribute to congestion of the mobile accelerator system 104.

In some embodiments, the data transfers routed without traversing the mobile accelerator system 104 may be optimized using non HTTP/HTTPS optimizations, such as lower layer optimizations. Some example optimizations may include transmission control protocol (TCP) optimization (e.g., for a long haul network), connection pooling, aggressive congestion control, user datagram protocol (UDP) optimization, large window size, and/or transport layer security (TLS) optimization. Method 600 may then proceed to 622 and end.

Returning to 606, in response to determining, based on the dynamic filter, that the content server 208 has not been (e.g., previously) associated with traffic that fails to use the predefined protocol of the port, method 600 may proceed to 610, where the proxy server 202 may be configured to determine whether the traffic currently is using the predefined protocol.

For example, the proxy server 202 may be configured to parse the traffic of the port 80 to determine whether the traffic is HTTP traffic. Additionally or alternatively, the proxy server 202 may be configured to parse the traffic of port 443 to determine whether the traffic is HTTPS traffic. As discussed above, mobile applications may use custom or non-standard protocols other than HTTP and HTTPS on ports 80 and 443 to avoid mobile network issues such as filtering, rate limiting, caching device, etc. However, some or all of the optimization techniques used for HTTP or HTTPs traffic may not be suitable for the custom protocol traffic. If parsing in accordance with a predefined protocol of the port fails to yield usable or meaningful data, the traffic may be determined as currently not using the predefined protocol. The parsing may include examining the first few packets of the traffic and attempting to parse based on HTTP or HTTPS.

In response to determining that the traffic currently fails to use the predefined protocol (and that the content server has not been previously associated with traffic that fails to use the predefined protocol based on the dynamic filter at 606), method 600 may proceed to 612, where the proxy server 202 may be configured to update the dynamic filter such that the content server 108 is associated with traffic that fails to use the predefined protocol.

If the content server 108 is new or otherwise has no previous entry within the dynamic filter, the proxy server 202 may be configured to add an entry associated with the content server 108 to the dynamic filter. For an example destination IP address 11.22.33.44, port 80 of the content server 108, and with reference to the dynamic filter 400 of FIG. 4, the proxy server 202 may be configured to add entry 410 (e.g., if it did not previously exist) including IP prefix 402 (11.22.33.0) determined based on the destination IP address 11.22.33.44. Furthermore, the Subnet mask ("netmask") 404 (e.g., 24, by default), the port 406 (e.g., 80), and a new TTL 408 (e.g., 12 hours) may also be added to the new entry 410. The TTL 408 may be a "new" TTL which, as used herein, refers to a reset or maximum duration that counts down over time until lapse (e.g., TTL 408=0). The 12 hour TTL 408 is only an example new TTL value, and one or more other times may be used. For example, content servers or IP prefixes that tend to have changing data protocols may be assigned lower TTLs to ensure a faster refresh rate of the dynamic filter for those content servers.

The netmask 404 reduces the number of entries and the storage volume required for implementing the dynamic filter. By default, the netmask 404 may be set to /24 (255.255.255.0), meaning that only 24 bits of 32 bit IP addresses will be stored. Advantageously, content hosts may employ a range of server IP addresses having the same IP prefix, and thus individual entries for each server IP address is not required. With reference to entry 412 of the dynamic filter 400, the Netmask /24 may be applied to a destination IP address 22.33.45.10, resulting in 22.33.45.10/24, which is converted to the IP Prefix 22.33.45.0 as shown by the entry 412. Similarly, when the proxy server 202 receives traffic associated with an IP address, the Netmask /24 may be applied to the content server address to determine an IP prefix. Here, all IP addresses between 22.33.45.0 and 22.33.45.255 will be converted to the IP prefix 22.33.45.0 based on applying the Netmask /24. The IP prefix may then be compared with the listed IP prefixes of the dynamic filter, along with the port number as discussed above.

In another example, the content server 108 may already be listed within the dynamic filter, but includes a lapsed TTL 408. Here, the proxy server may be configured to update the dynamic filter by assigning a new TTL to the entry such that the analysis of the port traffic remains useable for the duration of the new TTL.

In that sense, an expiration of the TTL results a subsequent connection to the content server 108 triggering another parsing of the traffic to see if it remains different from the HTTP/HTTPS traffic. Furthermore, exceptions, errors, or the like for analyzed traffic do not cause permanent mistakes without expiration within the dynamic filter.

At 614, the proxy server 202 may be configured to route data transfers between the mobile device 102 and the content server 208 to bypass the proxy server 202. The discussion at 608 may be applicable at 614. Method 600 may then proceed to 622 and end.

Returning to 610, in response to determining that the traffic is using the predefined protocol (and that the content server has not been previously associated with traffic that fails to use the predefined protocol within the dynamic filter at 606, such as by not being listed or by having a lapsed TTL), method 600 may proceed to 616, where the proxy server 202 may be configured to optimize the traffic based on the predefined protocol. For example, the traffic on port 80 may be currently using the HTTP protocol, or the traffic on port 443 may be currently using the HTTPS protocol, and thus are susceptible to HTTP/HTTPS traffic optimizations. For HTTP traffic, some example optimizations may include HTTP keep-alive, caching, front-end optimization, data compression (e.g., HTTP compression) and connection pooling. For HTTPS traffic, some example optimizations may include connection pooling and data compression. The optimizations for HTTP and HTTPS traffic may also include lower layer optimizations such as TCP aggressive congestion control, dynamic windows size, packet level encryption and user datagram protocol (UDP) optimization.

The proxy server 202 may be further configured to update the dynamic filter where appropriate. For example, if the content server 108 previously was included within the dynamic filter based on a prior analysis of the traffic, the proxy server 202 may be configured update the dynamic filter to remove the entry associated with the content server 108 from the dynamic filter. As such, subsequent lookup of the dynamic filter would not result in data transfer bypass for the content server 108 in the manner discussed at 606 and 608.

At 618, the proxy server 202 (e.g., content router module 208) may be configured to determine a dynamic path between the mobile device 102 and the content server 108 through the proxy server 202 of the entry POP 110a. At 620, the proxy server 202 may be configured to route data transfers between the mobile device 102 and the content server 108 through the dynamic path.

In some embodiments, the NProxy module 206 may be configured to request dynamic path routing from the content router module 208, such as based on providing the destination IP address of the content server 102 to the content router module 208. For HTTP traffic, the proxy server 202 may be configured to attempt determine content server destination based on the destination IP address and/or Host:header value of the HTTP traffic. For HTTPS traffic, the proxy server 202 may be configured to determine content server destination based on the destination IP address and/or SNI hostname value of the HTTPS traffic.

The content router module may be configured to determine a "POP connection score" for dynamic paths that include the proxy server 202 of the entry POP 110a (and if optimal, an exit POP 110b). The "POP connection score" of a dynamic path, as used herein, refers to a measure of the quality of the dynamic path (e.g., including the first mile, middle mile, and last mile) between the mobile device 102 and the content server 108 through one or more POPS 110 of the mobile accelerator system 104.

For a dynamic path including an exit POP 110b (e.g., separate from the entry POP 110a), the POP connection score may be determined as a combination of an entry POP score between mobile device 102 and the entry POP 110a, a POP-to-POP score between the entry POP 110a and an exit POP 110b (and any intervening next POPs), and an exit POP score between the exit POP 110b and the content server 108.

For a dynamic path that does not include a separate exit POP 110b, the POP connection score may be determined as a combination of the entry POP score between mobile device 102 and the entry POP 110a, and an exit POP score between the entry POP 110a (acting also as an exit POP) and the content server 108.

In some embodiments, each of the POP connection scores, entry POP scores, POP-to-POP scores, and exit POP scores may be determined based on data transfer speed, such as by measuring synthetic latencies. Additional details regarding the dynamic path scoring and selection by a content router module of a mobile accelerator system are discussed in U.S. patent application Ser. No. 14/644,116, which is incorporated by reference above.

Method 600 may be repeated. For example, the updated dynamic filter may be used when the proxy server 202 receives subsequent traffic associated with the content server 102 that uses the port associated with the predefined protocol. The proxy server 202 may check the dynamic filter, and route data transfers to bypass the proxy server 202 (and the mobile accelerator system 104) when the content server 108 has a non-lapsed entry (based on TTL) within the dynamic filter. Alternatively, if the dynamic filter does not indicate a bypass for the content server 108, the proxy server 202 may analyze the subsequent traffic to determine whether the subsequent traffic is using the predefined protocol, update the dynamic filter accordingly, and so forth.

In some embodiments, the proxy server 202 may be configured to share its dynamic filter and/or dynamic filter updates with one or more POPs 110 of the mobile accelerator system 104 (e.g., including mobile POPs). The sharing can be on a scheduled basis, on request, etc. and may be performed to reduce duplicative parsing of traffic associated with the same content server by individual POPs 110. Method 600 may then proceed to 622 and end.

CONCLUSION

Many modifications and other embodiments will come to mind to one skilled in the art to which these embodiments pertain having the benefit of the teachings presented in the foregoing descriptions and the associated drawings. For example, while techniques for mobile device acceleration are discussed herein as being performed over the Internet, they may also be applicable to data delivery acceleration on other wide area networks and/or other (e.g., stationary, wired communication) devices. In another example, while ports 80 and 443 and the associated HTTP and HTTPS protocols are discussed in detail herein, other ports with associated predefined protocols may employ a dynamic filter to provide mobile accelerator system bypass when appropriate or advantageous. Therefore, it is to be understood that embodiments and implementations are not to be limited to the specific examples disclosed and that modifications and other embodiments are intended to be included within the scope of the appended claims.

That which is claimed:
1. A mobile accelerator system, comprising:
a plurality of point of presences (POPs), wherein the plurality of POPs includes an entry POP that is configured to:
receive a query from a mobile device via a dedicated transport channel between the mobile device and the entry POP, wherein the query is to a content server,
determine a direct connection score for a direct connection between the mobile device and the content server that does not traverse the mobile accelerator system, determine a POP connection score for a connection between the mobile device and the content server through the entry POP and a candidate exit POP of the plurality of POPs, determine a dynamic path ranking based on the direct connection score, the POP connection score, and one or more other POP connection scores associated with one or more other candidate exit POPs of the mobile accelerator system, determine at least a portion of a dynamic path between the mobile device based on the dynamic path ranking, and route data transfers between the mobile device and the content server through the at least the portion of the dynamic path.

2. The mobile accelerator system of claim 1, wherein the entry POP configured to determine the direct connection score includes the entry POP configured to determine a synthetic latency between the mobile device and the content server without traversing the mobile accelerator system.

3. The mobile accelerator system of claim 1, wherein the entry POP configured to determine the POP connection score includes the entry POP configured to determine a synthetic latency between the entry POP and the content server without traversing a next POP of the mobile accelerator system.

4. The mobile accelerator system of claim 1, wherein the entry POP configured to determine the POP connection score includes the entry POP configured to determine a POP-to-POP score based on a synthetic latency between the entry POP and the candidate exit POP.

5. The mobile accelerator system of claim 1, wherein the entry POP configured to determine the POP connection score includes the entry POP configured to determine an exit POP score based on a synthetic latency between an exit POP of the mobile accelerator system and the content server.

6. The mobile accelerator system of claim 1, wherein the entry POP configured to route the data transfers through the at least a portion of the dynamic path includes the entry POP configured to route the data transfers through an exit POP of the mobile accelerator system.

7. The mobile accelerator system of claim 1, wherein the entry POP configured to route the data transfers through the at least a portion of the dynamic path includes the entry POP configured to route the data transfers through the entry POP as a single entry/exit POP.

8. A non-transitory computer-readable medium that provides instructions that, if executed by a processor of a point of presence (POP), will cause the processor to perform operations comprising:

receiving a query from a mobile device via a dedicated transport channel between the mobile device and the POP, wherein the POP is an entry POP, wherein the query is to a content server, and wherein the POP is one of a plurality of POPs of a mobile accelerator system;

determining a direct connection score for a direct connection between the mobile device and the content server that does not traverse the mobile accelerator system;

determining a POP connection score for a connection between the mobile device and the content server through the entry POP and a candidate exit POP of the plurality of POPs;

determining a dynamic path ranking based on the direct connection score, the POP connection score, and one or more other POP connection scores associated with one or more other candidate exit POPs of the mobile accelerator system;

determining at least a portion of a dynamic path between the mobile device based on the dynamic path ranking; and routing data transfers between the mobile device and the content server through the at least a portion of the dynamic path.

9. The non-transitory computer-readable medium of claim 8, wherein determining the direct connection score includes determining a synthetic latency between the mobile device and the content server without traversing the mobile accelerator system.

10. The non-transitory computer-readable medium of claim 8, wherein determining the POP connection score includes determining a synthetic latency between the entry POP and the content server without traversing a next POP of the mobile accelerator system.

11. The non-transitory computer-readable medium of claim 8, wherein determining the POP connection score includes determining a POP-to-POP score based on a synthetic latency between the entry POP and the candidate exit POP.

12. The non-transitory computer-readable medium of claim 8, wherein determining the POP connection score includes determining an exit POP score based on a synthetic latency between an exit POP of the mobile accelerator system and the content server.

13. The non-transitory computer-readable medium of claim 8, wherein routing the data transfers through the at least a portion of the dynamic path includes routing the data transfers through an exit POP of the mobile accelerator system.

14. The non-transitory computer-readable medium of claim 8, wherein routing the data transfers through the at least a portion of the dynamic path includes routing the data transfers through the entry POP as a single entry/exit POP.

15. A method executed at a point of presence (POP), comprising:

receiving a query from a mobile device via a dedicated transport channel between the mobile device and the POP, wherein the POP is an entry POP, wherein the query is to a content server, and wherein the POP is one of a plurality of POPs of a mobile accelerator system;

determining a direct connection score for a direct connection between the mobile device and the content server that does not traverse the mobile accelerator system;

determining a POP connection score for a connection between the mobile device and the content server through the entry POP and a candidate exit POP of the plurality of POPs;

determining a dynamic path ranking based on the direct connection score, the POP connection score, and one or more other POP connection scores associated with one or more other candidate exit POPs of the mobile accelerator system;

determining at least a portion of a dynamic path between the mobile device based on the dynamic path ranking; and routing data transfers between the mobile device and the content server through the at least a portion of the dynamic path.

16. The method of claim 15, wherein determining the direct connection score includes determining a synthetic latency between the mobile device and the content server without traversing the mobile accelerator system.

17. The method of claim 15, wherein determining the POP connection score includes determining a synthetic latency between the entry POP and the content server without traversing a next POP of the mobile accelerator system.

18. The method of claim 15, wherein determining the POP connection score includes determining a POP-to-POP score based on a synthetic latency between the entry POP and the candidate exit POP.

19. The method of claim 15, wherein determining the POP connection score includes determining an exit POP score based on a synthetic latency between an exit POP of the mobile accelerator system and the content server.

20. The method of claim 15, wherein routing the data transfers through the at least a portion of the dynamic path includes routing the data transfers through an exit POP of the mobile accelerator system.

21. The method of claim 15, wherein routing the data transfers through the at least a portion of the dynamic path includes routing the data transfers through the entry POP as a single entry/exit POP.

* * * * *